(12) United States Patent
Oz et al.

(10) Patent No.: US 7,110,355 B1
(45) Date of Patent: Sep. 19, 2006

(54) AUTOMATIC SIDE SELECTION IN DOUBLE-RING TOPOLOGIES

(75) Inventors: Doron Oz, Even Yehuda (IL); Eldad Bar-Eli, Ramat Hasharon (IL)

(73) Assignee: Cisco Technology, Inc., San Jose, CA (US)

( * ) Notice: Subject to any disclaimer, the term of this patent is extended or adjusted under 35 U.S.C. 154(b) by 877 days.

(21) Appl. No.: 09/929,881

(22) Filed: Aug. 14, 2001

(51) Int. Cl.
*G01R 11/00* (2006.01)
(52) U.S. Cl. ..................... 370/222; 370/258
(58) Field of Classification Search ............ 370/254, 370/341, 352–356, 395.41, 424, 425; 709/252, 709/225
See application file for complete search history.

(56) References Cited

U.S. PATENT DOCUMENTS

| | | | |
|---|---|---|---|
| 6,188,675 B1* | 2/2001 | Casper et al. | 370/254 |
| 6,643,269 B1* | 11/2003 | Fan et al. | 370/254 |
| 6,657,968 B1* | 12/2003 | Emberty et al. | 370/242 |
| 6,876,625 B1* | 4/2005 | McAllister et al. | 370/221 |
| 2003/0005131 A1* | 1/2003 | Hsu et al. | 709/228 |
| 2004/0190461 A1* | 9/2004 | Gullicksen et al. | 370/258 |

OTHER PUBLICATIONS

Cisco Systems White Paper, "Dynamic Packet Transport Technology and Applications Overview," Jul. 1, 2000.
Cisco Systems White Paper, "Dynamic Packet Transport Technology and Performance," Jan. 5, 2001.
Cisco Systems White Paper, "Spatial Reuse Protocol Technology," Jan. 3, 2001.

* cited by examiner

*Primary Examiner*—Chau Nguyen
*Assistant Examiner*—Christopher Grey
(74) *Attorney, Agent, or Firm*—Cindy Kaplan

(57) ABSTRACT

Connecting a new node to a double ring network or establishing a new network having a double ring network is greatly simplified by automatic mapping of logical interfaces to physical interfaces to conform to a mapping or polarity observed by other nodes in the network. A node may discover the network polarity via a message received from an adjacent node and, if necessary, invert the mapping between its two logical interfaces and two physical interfaces. This facilitates installation by relaxing the requirement that the correct media pair be connected to the correct node physical interface. Nodes equipped with this automatic side selection capability may interoperate with nodes that are not so-equipped.

30 Claims, 5 Drawing Sheets

AUTOMATIC SIDE SELECTION IN DOUBLE-RING TOPOLOGIES

STATEMENT OF RELATED APPLICATIONS

The present application is related to the subject matter of U.S. application Ser. No. 09/799,755 entitled "Node Detection and Ring Configuration for Physical Star Connected Networks", filed on Mar. 6, 2001, the contents of which are incorporated herein by reference in their entirety.

BACKGROUND OF THE INVENTION

The present invention relates to digital communication networks and more particularly, to the configuration of network nodes interconnected in ring topologies.

Increasingly, fiber optic technology is being deployed to answer the need to accommodate increasing volumes of Internet traffic including web-based electronic commerce, voice over IP, (VoIP), video over IP, and virtual private networking (VPN). In many cases, fiber optic technology has been adapted for use on the Internet by exploiting network topologies and protocols that were themselves originally developed for use in carrying multiple streams of telephony traffic using time domain multiplexing (TDM) technology.

In particular, many metropolitan and backbone networks providing IP data communication services rely on the SONET protocol developed for voice telephony traffic to provide transport services through optical fiber-based networking equipment. To provide reliability, SONET nodes are often arranged in a ring configuration where one or more rings interconnect a series of fiber optic nodes. The ring configuration provides survivability and robustness in that if a ring segment between two nodes fails, traffic may be sent the other way around the ring, or shifted to a different parallel ring if necessary.

This architecture is, however, not ideal for modern Internet traffic requirements. The multiplexed SONET data streams each have fixed bandwidth and there is no opportunity to take full advantage of statistical multiplexing, i.e., allocate bandwidth currently left unused by some services to other services experiencing peak requirements. SONET architecture therefore does not fully exploit the advantages of packet-based network networking. Furthermore, a very large percentage of the bandwidth in a SONET ring is left unused in order to implement the ring self-healing capabilities described above.

In order to address these concerns and provide other capabilities, Cisco Systems, Inc., has developed Dynamic Packet Transport (DPT) and Spatial Reuse Protocol (SRP) for use with ring-based media. These solutions combine the bandwidth efficiency and ready compatibility with Internet services of IP routing techniques with the very large bandwidth and self-healing capabilities of fiber rings. Although SONET framing may be used, TDM timeslots are not reserved for particular services or connections. Instead, DPT and SRP divide the available bandwidth among nodes and services on a real-time basis in an optimal and fair fashion. Furthermore, instead of reserving an entire ring for protection, both rings of a pair may be concurrently utilized to pass working traffic.

A DPT ring pair consists of two counter-rotating fibers, each of which can be concurrently utilized to pass both data and control packets. To distinguish between the two rings, one is referred to as the "inner" and the other "outer" ring. Data packets for a particular bi-directional connection travel on one ring and corresponding control packets travel in the opposite direction on the other ring. Packets are stripped from the ring by the destination station.

FIG. 1 depicts a simplified representation of a network employing a bi-directional dual counter-rotating ring topology such as employed by DPT/SRP. Six nodes, numbered I–VI are interconnected. Each of the six depicted nodes has two sides labeled "A" and "B." Each A side is equipped with an input for the outer ring and an output for the inner ring whereas each B side is equipped with an input for the inner ring and an output for the outer ring.

A practical difficulty arises in connecting a new node to this network in that there will be two fiber pairs available at the node site and the installer will have to determine which pair to connect to the A side and which pair to connect to the B side. Unless this is done to match the existing connections in the ring, the ring will not operate properly.

In effect, a node may be said to have one of two "polarities." The polarity identifies which ring is "inner" and which ring is "outer" according to the DPT/SRP protocol. In FIG. 1, the polarity can be reversed by flipping each node's B side and A side. When a new double ring network is set up, a polarity must somehow be determined and observed by all the nodes. When a new node joins an existing ring, it must adopt a polarity that will match the polarities of the other nodes on the ring. In, for example, a metropolitan network, the nodes will be widely dispersed and it may be difficult to determine which fiber pair should be connected to which side of the node to establish or conform to network polarity.

What is needed are systems and methods for simplifying the establishment and maintenance of network polarity in double ringed topologies.

SUMMARY OF THE INVENTION

By virtue of one embodiment of the present invention, connecting a new node to a double ring network or establishing a new network having a double ring network is greatly simplified by automatic mapping of logical interfaces to physical interfaces to conform to a mapping or polarity observed by other nodes in the network. A node may discover the network polarity via a message received from an adjacent node and, if necessary, invert the mapping between its two logical interfaces and two physical interfaces. This facilitates installation by relaxing the requirement that the correct media pair be connected to the correct node physical interface. To facilitate the discovery and propagation of network polarity information, individual nodes maintain not only polarity state information but also an indication of whether the current locally maintained polarity state is in fact known to be correct for the network.

According to a first aspect of the present invention, a method for configuring a network node that is connected in a dual ring includes receiving ring connection polarity information from a first adjacent node in the dual ring. The ring connection polarity information includes a ring connection polarity state configured at the first adjacent node and an indication whether the ring connection state is fixed or floating. The method further includes adopting the ring connection polarity state of the first adjacent node if the ring connection polarity state configured there is fixed.

A second aspect of the present invention provides apparatus for operating a network node connected in a dual ring. The apparatus includes a first interface in two-way communication with a first adjacent node in the dual ring. The first interface receives ring connection polarity information from the first adjacent node. The ring connection polarity information includes a ring connection polarity state configured at the first adjacent node and an indication whether the ring connection polarity state configured there is fixed or floating. The apparatus further includes a second interface in two-way communication with a second adjacent node in a dual ring and a network node controller that, if the ring connection polarity state configured at the first adjacent node is fixed, adopts the ring connection polarity state of the first adjacent node.

Further understanding of the nature and advantages of the inventions herein may be realized by reference to the remaining portions of the specification and the attached drawings.

DESCRIPTION OF SPECIFIC EMBODIMENTS

The present invention will be described with reference to a specific application in dual ring networks that operate in accordance with dynamic packet transport (DPT) and spatial reuse protocol (SRP). Details of SRP/DPT operation are described Tsiang, et al., "The Cisco SRP MAC Layer Protocol," Request for Comments 2892, August 2000, Internet Engineering Task Force. The contents of this protocol document are incorporated herein by reference in their entirety for all purposes. In the representative application network, framing of data is in accordance with the well-known SONET standard. This application is, however, merely representative. The present invention may find application, in, e.g., any network where node connections preferably observe a particular polarity.

Figure 2:
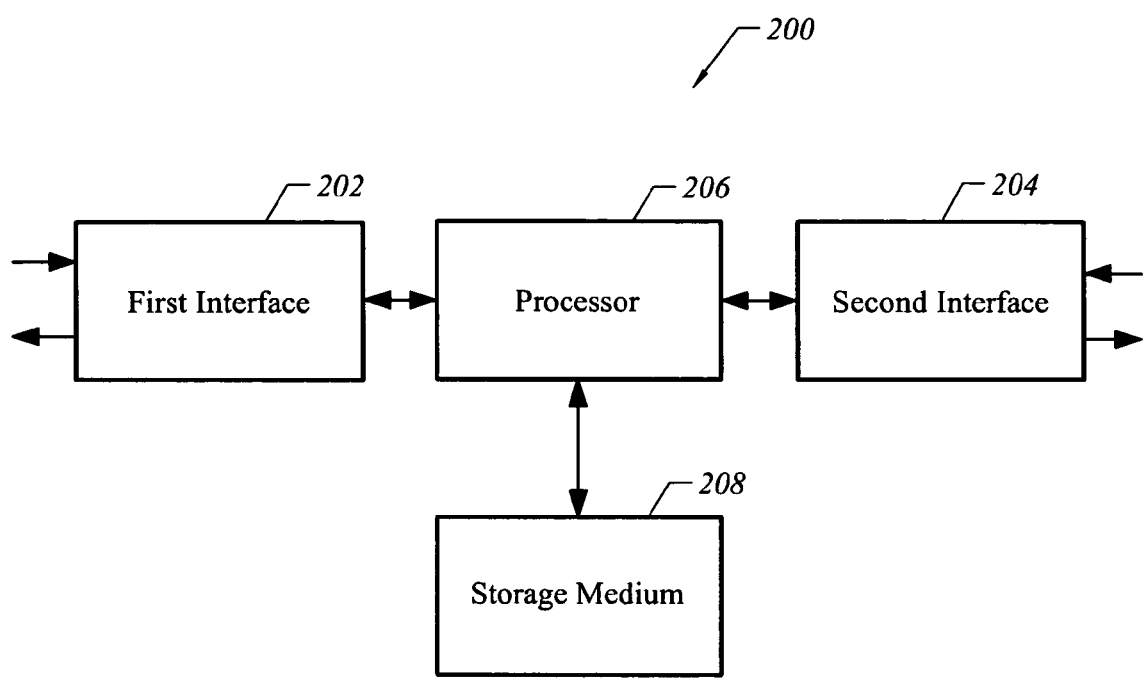
FIG. 2 depicts elements of a network node according to one embodiment of the present invention.

FIG. 2 generally depicts the structure of a network node 200 according to one embodiment of the present invention. Network node 200 is designed to operate in a network having a ring structure. Accordingly, network node 200 includes a first physical interface 202 and a second physical interface 204. Both first physical interface 202 and second physical interface 204 have both an input and an output. In one embodiment, first physical interface 202 and second physical interface 204 are fiber optic interfaces that operate at an OC-48 data rate. Physical interfaces 202 and 204 incorporate lasers, photo-detectors, modulators and demodulators as necessary to extract electrical information from received optical signals and encode data on optical signals to be transmitted. Physical interfaces 202 and 204 are used to connect to the dual ring.

However, in one embodiment, network node 200 incorporates further interfaces (not shown) to provide access to the ring to other devices. For example, there may be numerous 10/100 Ethernet interfaces. For example, the dual ring may implement a metropolitan area network (MAN) with local access being provided by the 10/100 Ethernet interfaces. Alternatively, network node 200 includes a very high speed interface to connect the ring to a backbone.

A processor 206 preferably operates the various interfaces so that node 200 interacts with the ring network in accordance with the DPT and SRP protocols. Processor 206 also performs the automatic side selection process described herein. Processor 206 may be implemented in any suitable manner such as e.g., a general programmable processor, custom logic, a multiprocessor system, or any combination thereof, etc. Processor 206 may execute software instructions in any suitable machine level or high level programming language. Storage medium 208 may represent a memory device such as a random memory access device, a magnetic storage medium, an optical storage medium, etc. Instructions on storage medium 208 may be loaded from another storage medium such as, e.g., a compact disc (CD), a digital video disc (DVD), a floppy disk, etc. Another example of loading instructions from storage a medium is downloading software from a network.

Figure 1:
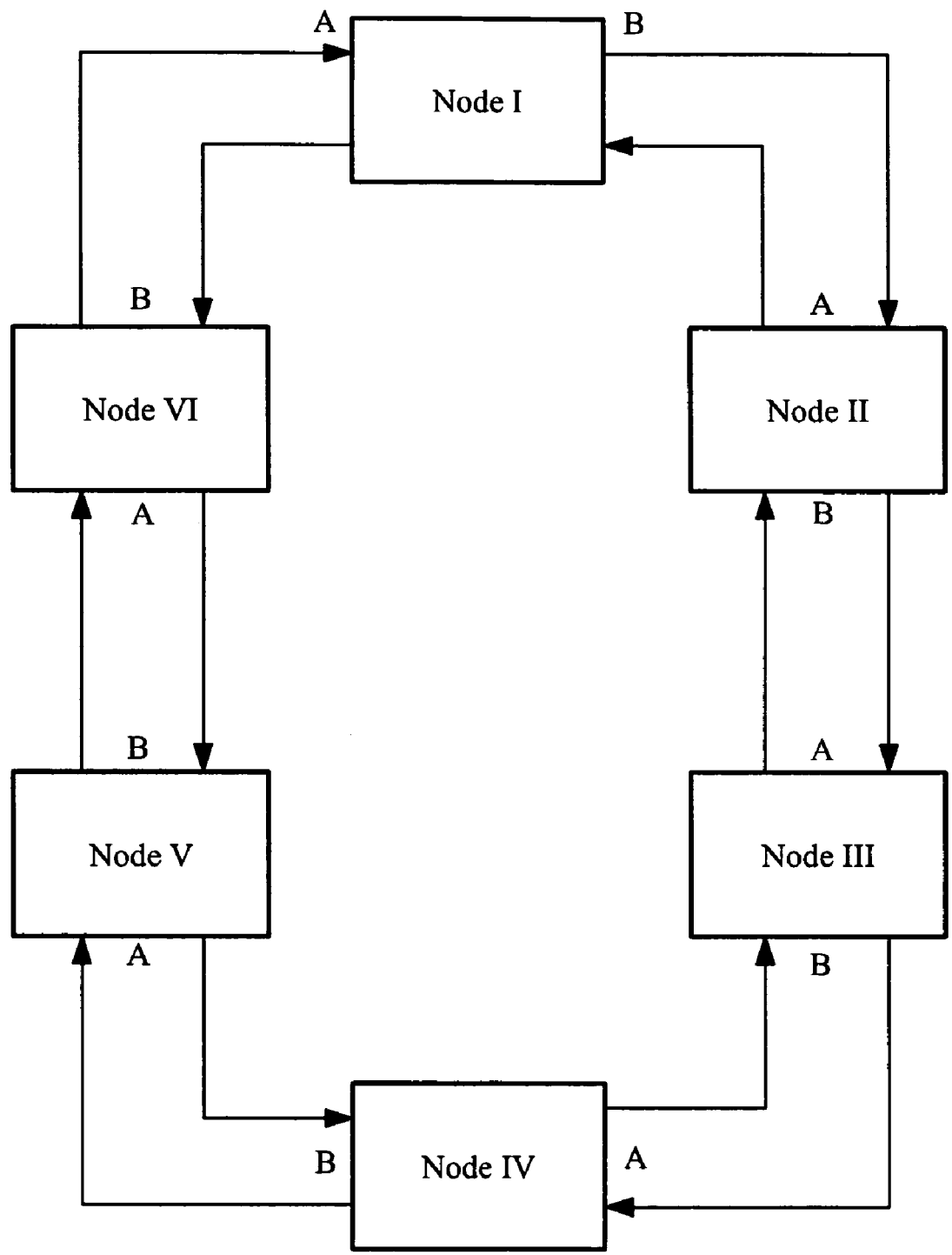
FIG. 1 depicts a network having a dual ring topology.
Figure 3:
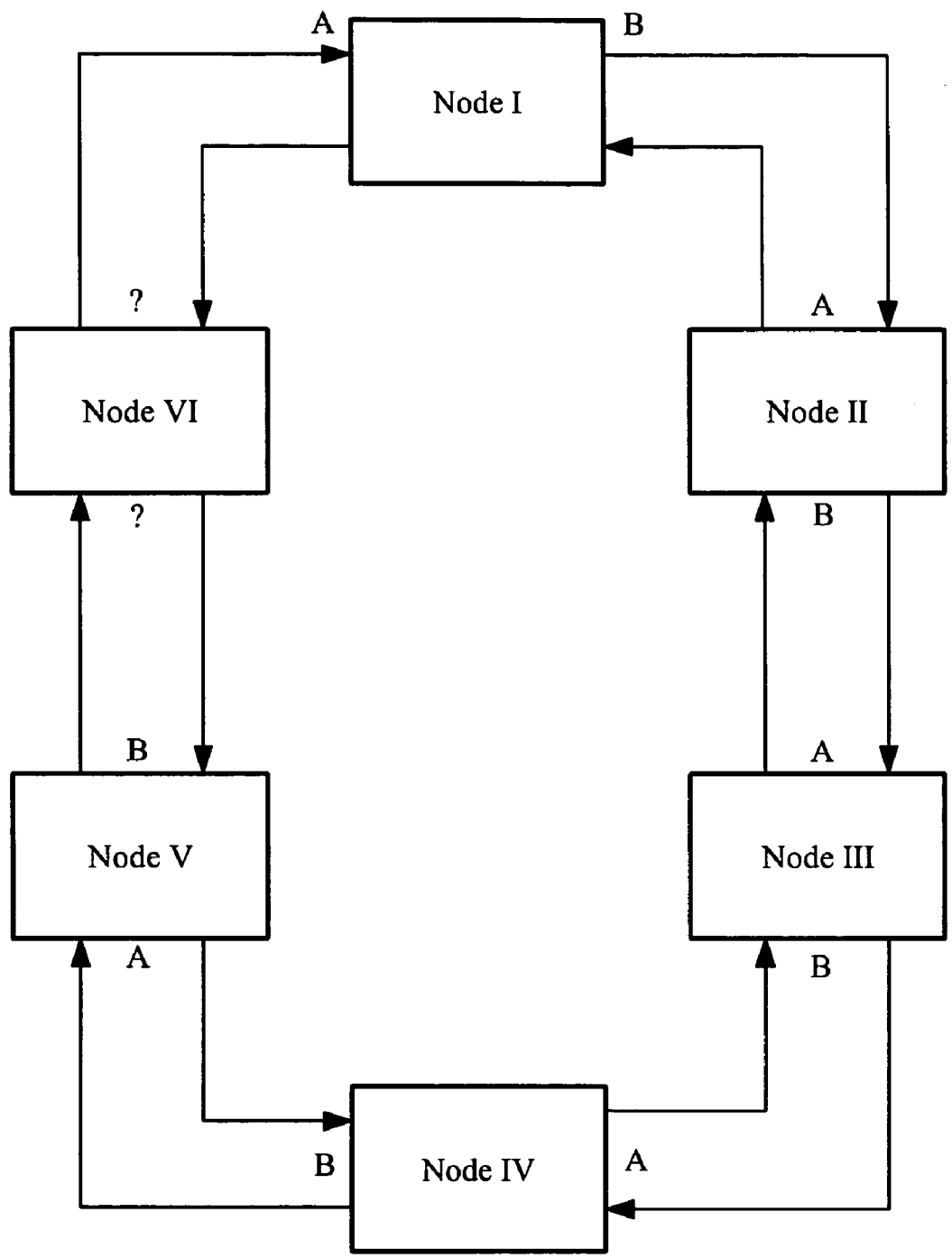
FIG. 3 depicts a dual ring network where a new node is to be installed in the network according to one embodiment of the present invention.

According to one embodiment of the present invention, processor 206 controls the mapping of first interface 202 and second interface 204 to the logical ports A and B shown in FIG. 1 that are defined by DPT/SRP. By controlling this mapping, processor 206 can conform to either ring polarity as defined above. An application of the invention will be illustrated with reference to FIG. 3. FIG. 3 depicts a dual ring topology as in FIG. 1, but here, node VI is newly connected to the dual ring. Fiber connections have been made to connect node VI to the ring, but node VI begins its participation within the dual ring being unaware of the currently observed polarity.

Figure 5:
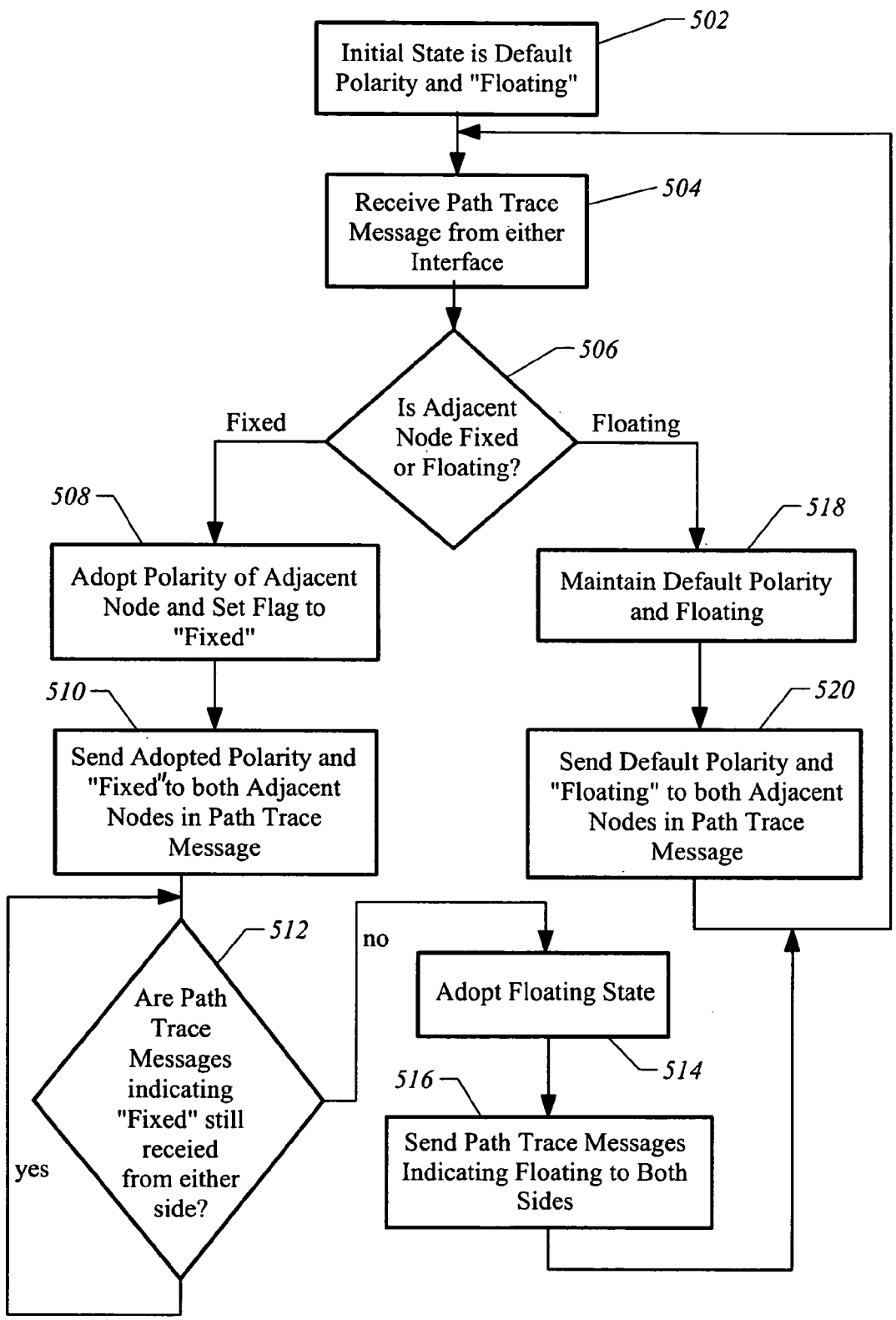
FIG. 5 is a flowchart describing steps of automatic slide selection of a network node installed in a dual ring according to one embodiment of the present invention.

FIG. 5 is a flowchart describing steps of acquiring the correct network polarity according to one embodiment of the present invention. At step 502, node VI is in an initial default state. For example, the default state may be that first physical interface 202 is mapped to the A side logical interface while second physical interface 204 is mapped to the B side logical interface. According to the present invention, a network node not only maintains polarity state information but also an indication of whether the currently maintained polarity state is in fact known to be correct for the network. In the initial default state, since node VI is as yet unaware of and has not adopted the actual network polarity, node VI is considered to be in a "floating" state. Once node VI acquires the correct polarity, it will be in a "fixed" state.

Node VI monitors the message traffic received from its adjacent nodes, node I and node V. In particular, it looks for a SONET path trace message generated and transmitted by the adjacent nodes. Each path trace message, as defined by the SONET standard, is modified to identify the logical interface, A or B, transmitting the message. Such a modification may be provided in accordance with the DPT/SRP standard. In this way, node VI can determine the network polarity observed by the adjacent node. Alternatively, the path trace message may explicitly identify the currently observed polarity. The path trace message is further modified to include information, e.g., a flag, indicating whether the transmitting node is itself in the fixed or floating state.

At step 504, node VI receives this path trace message via either of its two physical interfaces. At step 506, node VI determines whether the adjacent node is fixed or floating by extracting and examining the contents of the path trace message. If the adjacent node is in the fixed state, processing proceeds to step 508. At step 508, node VI adopts the polarity of the adjacent node and sets itself to the fixed state to indicate that the network polarity is now known. At step 510, node VI communicates the newly adopted polarity information and the fact that it is in the fixed state in its own path trace messages that it sends out via both physical interfaces.

Following step 510, at step 512 node VI monitors its interfaces to make sure that it continues to receive path trace messages from either side indicating that at least one adjacent node remains in the fixed state. Step 512 repeats for so long such as messages are received. If, however, no fixed state path trace messages are received, processing proceeds to step 514 where node VI adopts the floating state. This may indicate that the node has been removed from the ring. Then at step 516, node VI sends path trace messages via both interfaces indicating that it is in the floating state and returns to step 504.

If at step 506 it is determined that the adjacent node is floating, then at step 518, node VI maintains its default polarity state and remains in the floating state. At step 520, node VI transmits path trace messages to its adjacent nodes reflecting its default polarity and indicating that node VI is in the floating state. After step 520, node VI again awaits receipt, at step 504, of a path trace message from an adjacent node.

It can be seen then that through the process described in reference to FIG. 5, not only can a node learn of the current network polarity but it also passes along its knowledge to its adjacent nodes. The path trace messages are the medium for distributing this information. If the path trace message does not include the fixed/floating flag it is assumed that the adjacent node does not implement the automatic side selection capability of the present invention and its polarity is treated as being fixed.

Figure 4:
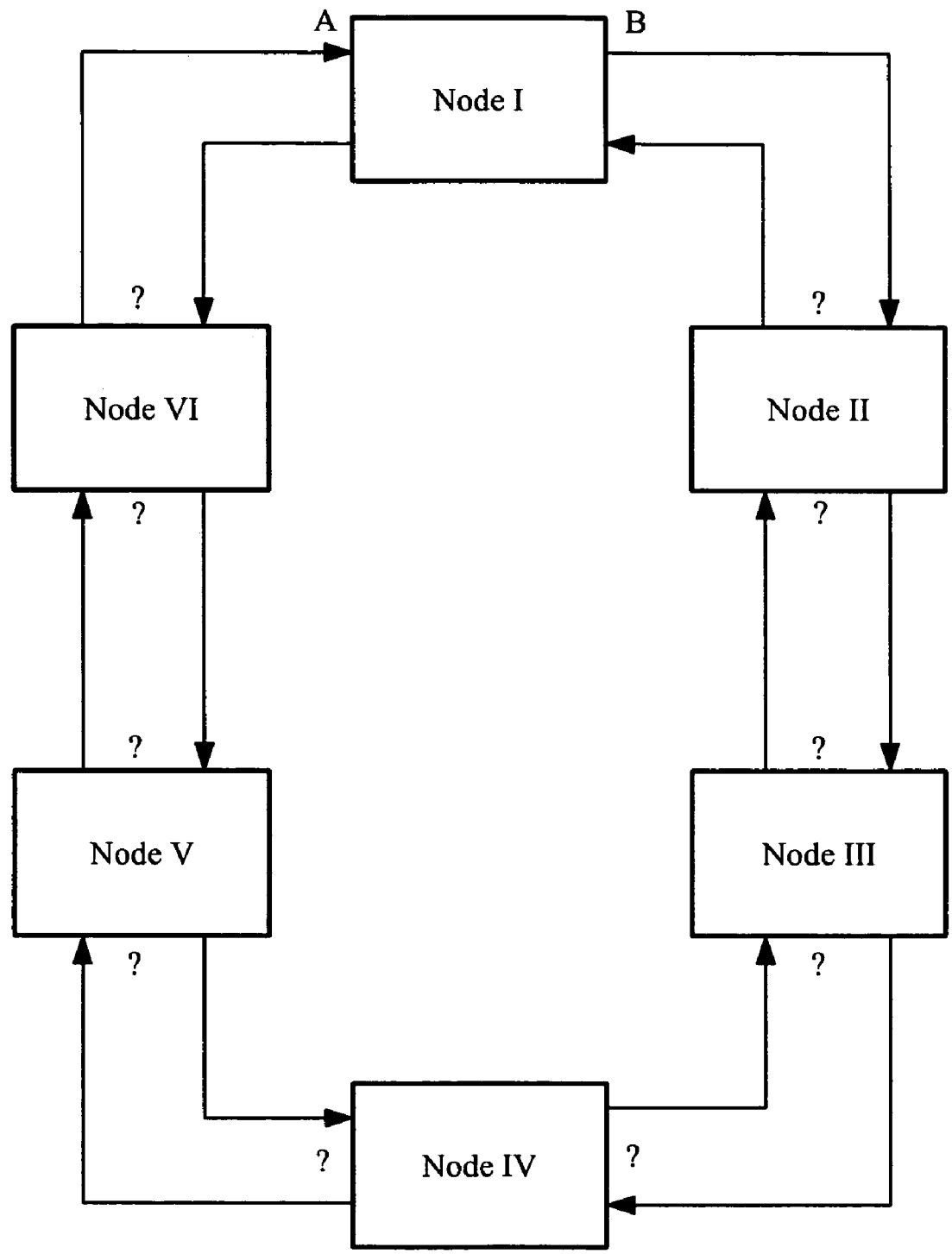
FIG. 4 depicts a dual ring network that is being newly established according to one embodiment of the present invention.

Referring now to FIG. 4, the case of establishment of a new ring where multiple nodes are interconnected and then turned on essentially simultaneously will now be considered. In FIG. 4, it is assumed that node I represents the head end of the ring. Node I, either does not incorporate the capability of the present invention, or has been forced to initialize in a fixed state with a predetermined mapping between logical interfaces A and B and the physical interfaces. The polarity determined by this mapping within node I will then propagate to node VI and node II via the path trace messages as described above. As nodes learn of the network polarity from the received path trace messages they either maintain their default states or reverse the existing mapping between physical interfaces and A or B sides. The polarity will continue to propagate through the ring until all nodes share the same polarity. Once all nodes share the same polarity and have A and B sides appropriately assigned, data communication services in accordance with SRP and DPT may begin. It will be appreciated that any of the nodes II through VI may be removed and reinserted readily with polarity being acquired when the node rejoins the ring.

It is understood that the examples and embodiments that are described herein are for illustrative purposes only and various modifications and changes in light thereof will be suggested to persons skilled in the art and are to be included within the spirit and purview of this application and scope of the appended claims and their full scope of equivalents. For example, although the present invention has been described in reference to DPT/SRP employing SONET framing, it will be appreciated if the present invention is not limited to and may be applied to e.g., conventional SONET rings, Resilient Packet Rings (RPR), or any interconnection of network nodes where a common polarity should be set. Also, messages conveying polarity and whether a node is in the fixed or floating state may be conveyed between nodes in accordance with any format and/or protocol and need not be SONET path trace messages.

The invention claimed is:

1. A method for configuring a network node that is connected in a dual ring, said method comprising:
   receiving ring connection polarity information from a first adjacent node in said dual ring, said ring connection polarity information comprising a ring connection polarity state configured at said first adjacent node and an indication whether said ring connection polarity state is fixed or floating; and
   if said ring connection polarity state configured at said first adjacent node is fixed, adopting said ring connection polarity state of said first adjacent node.

2. The method of claim 1 further comprising:
   if said ring connection polarity state configured at said first adjacent node is fixed,
   transmitting said ring connection polarity information to a second adjacent node including said adopted ring connection polarity state and an indication that said adopted ring connection polarity state is fixed.

3. The method of claim 1 further comprising:
   if said ring connection polarity state configured at said first adjacent node is floating, adopting a default ring connection polarity state.

4. The method of claim 3 further comprising:
   if said ring connection polarity state configured at said first adjacent node is floating, transmitting an indication of said default ring connection polarity state to a second adjacent node along with an indication that said default ring connection polarity state is floating.

5. The method of claim 3 further comprising:
   operating said network node within said dual ring in accordance with said adopted ring connection polarity state.

6. The method of claim 5 wherein operating said network node comprises operating said network node in accordance with DPT/SRP.

7. The method of claim 5 wherein receiving said ring connection polarity information comprises:
   receiving a path trace message; and
   extracting said ring connection polarity information from said path trace message.

8. Apparatus for operating a network node connected in a dual ring, said apparatus comprising:
   a first interface in two-way communication with a first adjacent node in said dual ring, said first interface receiving ring connection polarity information from said first adjacent node, said ring connection polarity information comprising a ring connection polarity state configured at said first adjacent node and an indication whether said ring connection polarity state is fixed or floating;
   a second interface in two-way communication with a second adjacent node in said dual ring; and
   a network node controller that, if said ring connection polarity state configured at said first adjacent node is fixed, adopts said ring connection polarity state of said first adjacent node.

9. The apparatus of claim 8 wherein if said ring connection polarity state configured at said first adjacent node is fixed, said second interface transmits said ring connection polarity information to said second adjacent node including said adopted ring connection polarity state and an indication that said adopted ring connection polarity state is fixed.

10. The apparatus of claim 8 wherein if said ring connection polarity state configured at said first adjacent node is floating, said network node controller adopts a default ring connection polarity state.

11. The apparatus of claim 10 wherein if said ring connection polarity state configured at said first adjacent node is floating, said second interface transmits an indication of said default ring connection polarity state to said second adjacent node along with an indication that said default ring connection polarity state is floating.

12. The apparatus of claim 10 wherein said network node controller operates said network node within said dual ring in accordance with said adopted ring connection polarity state.

13. The apparatus of claim 12 wherein said network node operates said network node in accordance with DPT/SRP.

14. The apparatus of claim 12 wherein said first interface receives said ring connection polarity information by:
  receiving a path trace message; and
  extracting said ring connection polarity information from said path trace message.

15. Apparatus for configuring a network node that is connected in a dual ring, said apparatus comprising:
  means for receiving ring connection polarity information from a first adjacent node in said dual ring, said ring connection polarity information comprising a ring connection polarity state configured at said first adjacent node and an indication whether said ring connection polarity state is fixed or floating; and
  means for, if said ring connection polarity state configured at said first adjacent node is fixed, adopting said ring connection polarity state of said first adjacent node.

16. The apparatus of claim 15 further comprising:
  means for, if said ring connection polarity state configured at said first adjacent node is fixed, transmitting said ring connection polarity information to a second adjacent node including said adopted ring connection polarity state and an indication that said adopted ring connection polarity state is fixed.

17. The apparatus of claim 15 further comprising:
  means for, if said ring connection polarity state configured at said first adjacent node is floating, adopting a default ring connection polarity state.

18. The apparatus of claim 17 further comprising:
  means for, if said ring connection polarity state configured at said first adjacent node is floating, transmitting an indication of said default ring connection polarity state to a second adjacent node along with an indication that said default ring connection polarity state is floating.

19. The apparatus of claim 17 further comprising:
  means for, operating said network node within said dual ring in accordance with said adopted ring connection polarity state.

20. The apparatus of claim 19 wherein said means for operating said network node comprises means for operating said network node in accordance with DPT/SRP.

21. The apparatus of claim 19 wherein said means for receiving said ring connection polarity information comprises:
  means for receiving a path trace message; and
  means for extracting said ring connection polarity information from said path trace message.

22. A computer program product for configuring a network node that is connected in a dual ring, said computer program product comprising:
  code that receives ring connection polarity information from a first adjacent node in said dual ring, said ring connection polarity information comprising a ring connection polarity state configured at said first adjacent node and an indication whether said ring connection polarity state is fixed or floating;
  code that, if said ring connection polarity state configured at said first adjacent node is fixed, adopts said ring connection polarity state of said first adjacent node; and
  a computer-readable storage medium that stores the codes.

23. The computer program product of claim 22 further comprising:
  code that, if said ring connection polarity state configured at said first adjacent node is fixed, transmits said ring connection polarity information to a second adjacent node including said adopted ring connection polarity state and an indication that said adopted ring connection polarity state is fixed.

24. The computer program product of claim 22 further comprising:
  code that, if said ring connection polarity state configured at said first adjacent node is floating, adopts a default ring connection polarity state.

25. The computer program product of claim 24 further comprising:
  code that, if said ring connection polarity state configured at said first adjacent node is floating, transmits an indication of said default ring connection polarity state to a second adjacent node along with an indication that said default ring connection polarity state is floating.

26. The computer program product of claim 24 further comprising:
  code that, operates said network node within said dual ring in accordance with said adopted ring connection polarity state.

27. The computer program product of claim 26 wherein said code that operates said network node comprises code that operates said network node in accordance with DPT/SRP.

28. The computer program product of claim 26 wherein said code that receives said ring connection polarity information comprises:
  code that receives a path trace message; and
  code that extracts said ring connection polarity information from said path trace message.

29. The method of claim 1 wherein said ring connection polarity state identifies one ring of said dual ring as an inner ring and other ring of said dual ring as an outer ring.

30. The method of claim 29 wherein the rings of said dual rings are identified as said outer ring or said inner ring in accordance with DPT/SRP.

* * * * *